(12) United States Patent
Kendrick et al.

(10) Patent No.: US 7,034,945 B2
(45) Date of Patent: Apr. 25, 2006

(54) FOURIER TRANSFORM SPECTROMETRY WITH A MULTI-APERTURE INTERFEROMETER

(75) Inventors: Richard Lee Kendrick, Foster City, CA (US); Eric H. Smith, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 362 days.

(21) Appl. No.: 10/627,404

(22) Filed: Jul. 25, 2003

(65) Prior Publication Data

US 2004/0095580 A1    May 20, 2004

Related U.S. Application Data

(60) Provisional application No. 60/398,611, filed on Jul. 26, 2002.

(51) Int. Cl.
*G01B 9/02* (2006.01)
*G01J 3/45* (2006.01)

(52) U.S. Cl. .................................................. 356/456
(58) Field of Classification Search ........ 356/451–456; 250/339.07, 8
See application file for complete search history.

(56) References Cited

U.S. PATENT DOCUMENTS

| | | | | |
|---|---|---|---|---|
| 4,136,954 A | * | 1/1979 | Jamieson | 356/456 |
| 4,856,884 A | * | 8/1989 | Fender et al. | 356/510 |
| 5,905,591 A | * | 5/1999 | Duncan et al. | 359/399 |

OTHER PUBLICATIONS

FFT Windowing, http://www.daqarta.com/ww00wndo.htm, pp. 1-8, printed Jul. 3, 2003.
Felgett, Spectrometre Interferentiel Multiplex Pour Mesures Infra-rouges Sur Les Etoiles, Les Editions de Physique, Reprinted with permission from Le Journal de Physice et le Radium, vol. 19, 237-240, Mar., 1958.
Kendrick et al., Imaging Fourier Transform Spectrometry with a Fizeau Interferometer, Proceedings of SPIE Reprint, reprinted from Interferometry in Space, Aug. 2002, Waikoloa, Hawaii.
Zarifis et al., The Multi Aperture Imaging Array, Optical and IR Interferometry from Ground and Space, ASP Conference Series, vol. 194, 1999, S.C. Unwin, and R.V. Stachnick, eds.
What is an Interferometer? http://huey.jpl.nasa.gov/keck/publicWWW/overview/intro-interferometry.html, pp. 1-3, printed Jul. 22, 2002.

* cited by examiner

*Primary Examiner*—Gregory J. Toatley, Jr.
*Assistant Examiner*—Patrick Connolly
(74) *Attorney, Agent, or Firm*—McDermott Will & Emery LLP

(57) ABSTRACT

A spectrometer configured to extract spectral information from a wavefront. The spectrometer includes a first collection device that includes an adjustable-optical path and configured to collect a first portion of a wavefront; a second collection device configured to collect a second portion of the wavefront; combiner optics configured to interfere the first and second portions of the wavefront at an image plane of the first and second collector devices to form interference patterns at the image plane; and a Fourier transformation module configured to derive spectral information from the interference patterns.

27 Claims, 5 Drawing Sheets

FOURIER TRANSFORM SPECTROMETRY WITH A MULTI-APERTURE INTERFEROMETER

CROSS-REFERENCE TO RELATED APPLICATION

This application claims priority to U.S. Provisional Patent Application No. 60/398,611, filed Jul. 26, 2002, titled IMAGING FOURIER TRANSFORM SPECTROMETRY WITH A FIZEAU INTERFEROMETER, and is incorporated by reference herein for all purposes.

BACKGROUND OF THE INVENTION

This invention relates generally to optical systems, such as spectrometers, and more specifically to methods and apparatus for extracting spectral information from a wavefront, such that select portions of the wavefront are sampled by a plurality of optical devices forming an Fizeau interferometer.

To extract spectral information from electromagnetic radiation, such as infrared radiation, light, and ultraviolet radiation, spectrometers are often employed. One commonly used spectrographic technique to extract spectral information from collected light includes spectrally dispersing (i.e., physically spreading out) the light into its constituent wavelengths with a prism or diffraction grating. Once the constituent wavelengths of the light are spectrally dispersed, various wavelength detection techniques may be used to determine whether given wavelengths are present in the light. For example, the spectral dispersion of the light may by calibrated and a simple photocell used to detect a wavelength's presence within the spectral dispersion. Spectral dispersion of light has been used by scientists for centuries to determine the colors in light. For example, Sir Isaac Newton in the seventeenth century used prisms to demonstrate that light is comprised of many colors by using a first prism to spectrally disperse light and a second prism to recombine the light.

More recently developed techniques for extracting spectral information from light include Fourier transform spectroscopy techniques. Typical Fourier transform spectroscopy techniques include splitting a collected wavefront into two wavefronts and interfering the wavefronts to form an interference pattern. An optical path length of one of the two wavefronts is typically varied to collect intensity information from a number of interference patterns formed by the interfering wavefronts. The intensity information is then Fourier transformed to extract spectral information for the wavefront. Fourier transform spectrometers that include Michelson interferometers have been used with some success to extract spectral information from electromagnetic radiation, such as light. However, such Fourier transform spectrometers provide limited spectral resolution of collected wavefronts. Moreover, Michelson interferometers are inherently inefficient due in part to the beam splitters that are used to split wavefronts because the beam splitters reflect and absorb electromagnetic radiation that does not contribute to forming interference patterns. In low light spectroscopy measurements, for example, the loss of light in a Michelson interferometer tends to adversely affect the quality of extracted spectral information.

Accordingly, industry continues to strive to develop new Fourier transform spectrometers and techniques to extract spectral information from collected electromagnetic radiation. Specifically, Fourier transform spectrometers are desired that employ Fizeau interferometers.

BRIEF SUMMARY OF THE INVENTION

This invention provides to optical systems, such as spectrometers, and more specifically provides methods and apparatus for extracting spectral information from a wavefront, such that select portions of the wavefront are sampled by a plurality of optical devices forming an Fizeau interferometer.

According to one embodiment, a spectrometer is provided that includes a first collection device that includes an adjustable-optical path and that is configured to collect a first portion of a wavefront; a second collection device configured to collect a second portion of the wavefront; combiner optics configured to interfere the first and second portions of the wavefront at an image plane of the first and second collector devices to form interference patterns at the image plane; and a Fourier transformation module configured to derive spectral information from the interference patterns. According to a specific embodiment, the Fourier transformation module is configured to Fourier transform the interference patterns to derive the spectral information. According to another specific embodiment, to derive the spectral information, the Fourier transformation module is configured to Fourier transform the interference patterns of the wavefront with the adjustable-optical path set at a variety of path lengths.

According to another embodiment, a spectrometer is provided that includes a plurality of sub-aperture telescopes forming an extended aperture telescope, wherein each sub-aperture telescope includes an adjustable optical-path and is configured to collect a select portion of a wavefront; combiner optics configured to interfere the select portions of the wavefront at an image plane of the plurality of sub-aperture telescopes to form interference patterns at the image plane; and a Fourier transformation module configured to derive spectral information from the interference patterns. According to a specific embodiment, to derive the spectral information, the Fourier transformation module is configured to Fourier transform the interference patterns with one or more of the adjustable-optical paths set at a variety of path lengths. The variety of path lengths represents a relative path-length difference between one or more of the adjustable-optical paths.

According to another embodiment, a Fourier transform spectrometer is provided that includes a Fizeau interferometer having a plurality of optical collectors, wherein one or more of the optical collectors includes an adjustable-optical path, and wherein each optical collector is configured to collect a select portion of a wavefront; and a Fourier transformation module configured to derive spectral information of the wavefront from interference patterns of the select portions of the wavefront. According to a specific embodiment, the Fizeau interferometer forms an extended aperture telescope. According to another specific embodiment, the spectrometer is configured to be deployed in space. According to another specific embodiment, to derive the spectral information, the Fourier transformation module is configured to Fourier transform the interference patterns of the wavefront with one or more of the adjustable-optical paths set at a variety of path lengths.

According to another embodiment, a method is provided for deriving spectral information from a wavefront and includes collecting a plurality of select portions of a wavefront with a corresponding plurality of sub-aperture telescopes which form a multi-aperture telescope; interfering the select portions of the wavefront at an image plane of the multi-aperture telescope to form interference patterns at the image plane; and Fourier transforming the interference patterns to derive spectral information for the wavefront. According to a specific embodiment, the method further includes generating a spectrogram from the spectral information. According to another specific embodiment, interfering the select portions of the wavefront includes interfering the select portions of the wavefront with a combiner telescope. According to another specific embodiment, the method further includes pistoning adjustable-optical paths of the sub-aperture telescopes at a plurality of positions; wherein each of the interference patterns corresponds to a select piston position of the adjustable-optical paths.

Numerous benefits may be achieved using the present invention over conventional techniques. For example, the invention provides for increased spectral resolution of scenes as well as localized sources. In other embodiments, a relatively large percentage of collected light contributes to the formation of interference fringes and thereby improves spectral resolution of low light signals. Depending upon the specific embodiment, there can be one or more of these benefits. These and other benefits are described throughout the present specification and more particularly below.

The invention will be better understood upon reference to the following detailed description in connection with the accompanying drawings and appended claims.

DESCRIPTION OF SPECIFIC EMBODIMENTS

This invention relates generally to optical systems, such as spectrometers, and more specifically to a method and apparatus for extracting spectral information from a wavefront, such that select portions of the wavefront are sampled by a plurality of optical devices forming an Fizeau interferometer.

Embodiments of the invention are best understood by first describing an exemplary Fourier transform spectrometer and methods for deriving spectral information from a wavefront and second briefly describing the theory of Fourier transform spectroscopy.

Figure 1:
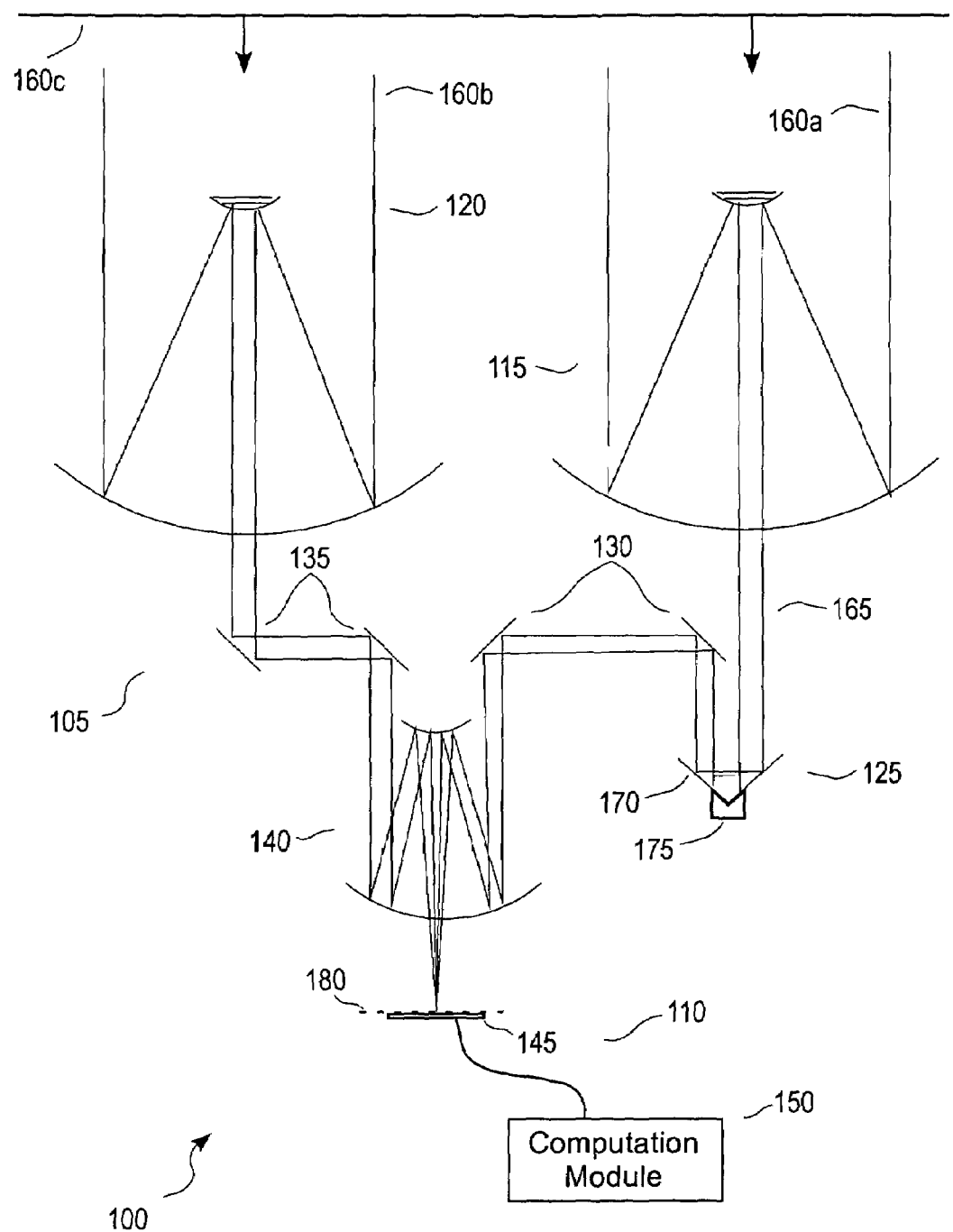
FIG. 1 shows a simplified diagram of a spectrometer according to an embodiment of the present invention.
Figure 2A:
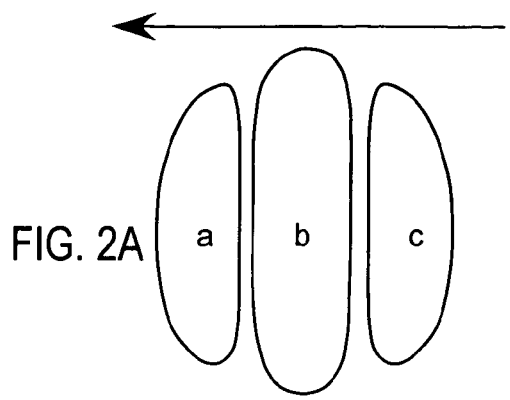
FIGS. 2A–2G show simplified interference patterns of interfering wavefronts of electromagnetic radiation that may be formed at an image plane and collected by an image-capture array according to an embodiment of the present invention.
Figure 2B:
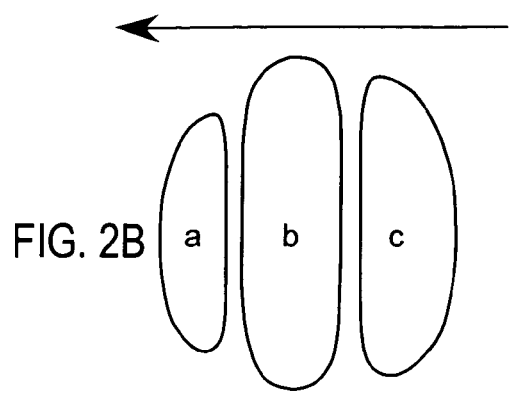
Figure 2C:
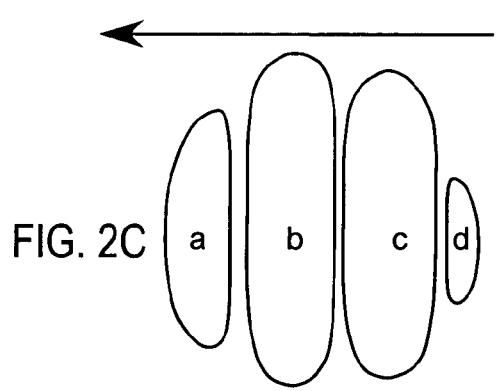
Figure 2D:
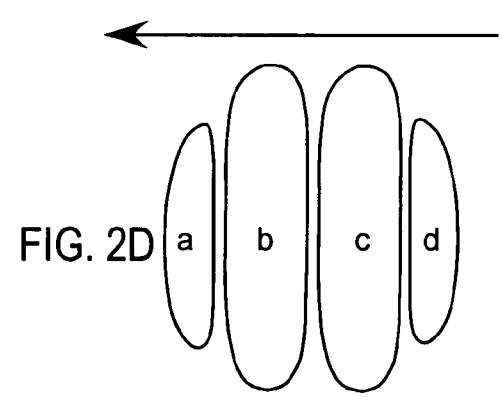
Figure 2E:
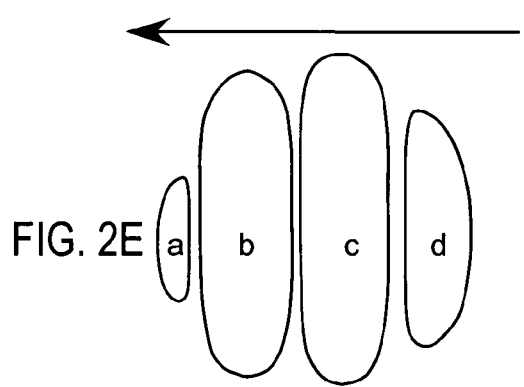
Figure 2F:
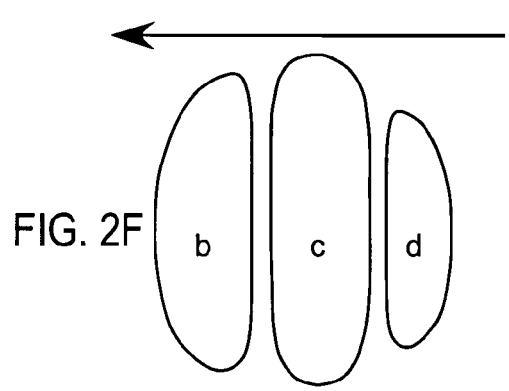
Figure 2G:
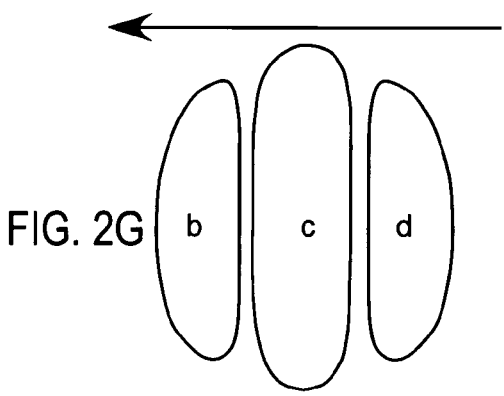

FIG. 1 shows a simplified diagram of a Fourier transform spectrometer 100 according to an embodiment of the present invention. Fourier transform spectrometer 100 includes a Fizeau interferometer 105 and a Fourier transformation module 110. Fizeau interferometer 105 is configured to collect select portions of a wavefront and interfere the collected portions of the wavefront on an image plane (i.e., focal plane) of the Fizeau interferometer to form interference patterns, such as a fringe patterns. Fizeau interferometers can be generally characterized as being configured to form interference patterns of collected wavefronts on the interferometers' image planes. Fourier transformation module 110 is configured to Fourier transform the interference patterns and thereby derive spectral information for the wavefront. Fizeau interferometer 105 and Fourier transformation module 110 are presently described in further detail.

According to one embodiment, Fizeau interferometer 105 includes first and second collection devices 115 and 120, respectively, an optical-path-delay mechanism 125, first and second steering mechanisms 130 and 135, respectively, and combiner optics 140. Fourier transformation module 110 may include an image-capture array 145 and a computation module 150. First and second collection devices 115 and 120 may include, respective, first and second afocal telescopes arranged in an extended aperture telescope configuration. While FIG. 1 shows that first and second collection devices 115 and 120 to be two element devices, these collection devices may have nearly any useful configuration, including, but not limited to, three mirror anastigmats, four mirror telescopes and the like. The first and second collection devices are configured to collect select wavefront portions 160a and 160b of a wavefront 160c. According to one embodiment, wavefronts portions collected by the first and second optical devices are essentially plane wavefronts. That is, the electromagnetic radiation, such as light, forming the wavefronts is substantially parallel. Substantially parallel electromagnetic radiation might emanate from a source that is essentially an infinite distance from Fourier transform spectrometer 100. An essentially infinite distance may be the distance to a cosmic body, such as a planet, star, galaxy or the like, or to an object positioned on the Earth on in the Earth's atmosphere.

According to one embodiment, optical-path-delay mechanism 125 is configured to vary the path length of an adjustable-optical path 165. Although collection devices 115 and 120 may be rigidly fixed with respect to one another, varying the path length of adjustable-optical path 165 may be viewed as pistoning the collection devices. Adjustable-optical path 165 may be extended or shortened by translating optical-path-delay mechanism 125 along adjustable-optical path 165. The optical-path-delay mechanism may include a set of delay optics 170 and a translation device 175 configured to translate the delay optics. Delay optics 170 may include a roof prism, a pair of reflective flats or other devices that are configured to reflect electromagnetic radiation received from collection device 115 to steering mechanism 130. Translation device 175 may include a piezoelectric device, a stack of piezoelectric devices, a solenoid, a combination of the foregoing or the like. Translation device 175 may be configured to translate delay optics 170 a number centimeters, a number microns, or a number of nanometers in sub-angstrom, angstrom, nanometer or larger steps. While Fizeau interferometer 105 is shown to include a single optical-path-delay mechanism 125 configured to vary adjustable-optical path 165 associated with collection device 115, according to one embodiment, the Fizeau interferometer may include a second optical-path-delay mechanism configured to vary an adjustable-optical path associated with collection device 120.

Wavefront portions 160a and 160b that are collected by collection devices 115 and 120 are steered by steering mechanisms 130 and 135 into combiner optics 140. Steering mechanism 130 and 135 may include a number of reflectors, such as reflective flats, that may by controlled by piezoelectric devices or the like to steer the wavefront portions. The combiner optics may include a combiner telescope that is configured to combine and interfere wavefront portions 160a and 160b at an image plane 180 (shown as a dashed line) and form interference patterns thereat. According to one embodiment, image-capture array 145 is disposed at the image plane and is configured to capture images of the interference pattern. Image-capture array 145 may include a charge coupled device (CCD) array, a complimentary metal oxide (CMOS) array or the like. The image-capture array is configured to generate electronic signals from the formed interference patterns. The electronic signals may be transferred to the computation module, which is configured to Fourier transform the received electronic signals. Fourier transformation of interference patterns is described in further detail below.

FIGS. 2A–2G show simplified interference patterns 200a–200g, respectively, of interfering wavefronts of electromagnetic radiation that may be formed at image plane 180 and collected by image-capture array 145. The exemplary interference patterns may be from a point source, such as a star. The interference patterns may be generated with adjustable-optical path 165 set at a number different lengths (e.g., 30 nanometers steps). As the adjustable-optical path is increased (or decreased), the fringes, labeled a-d, may sweep across image plane 160 from right to left (or left to right) as indicated by the leftward pointing arrows above each interference pattern.

Figure 3:
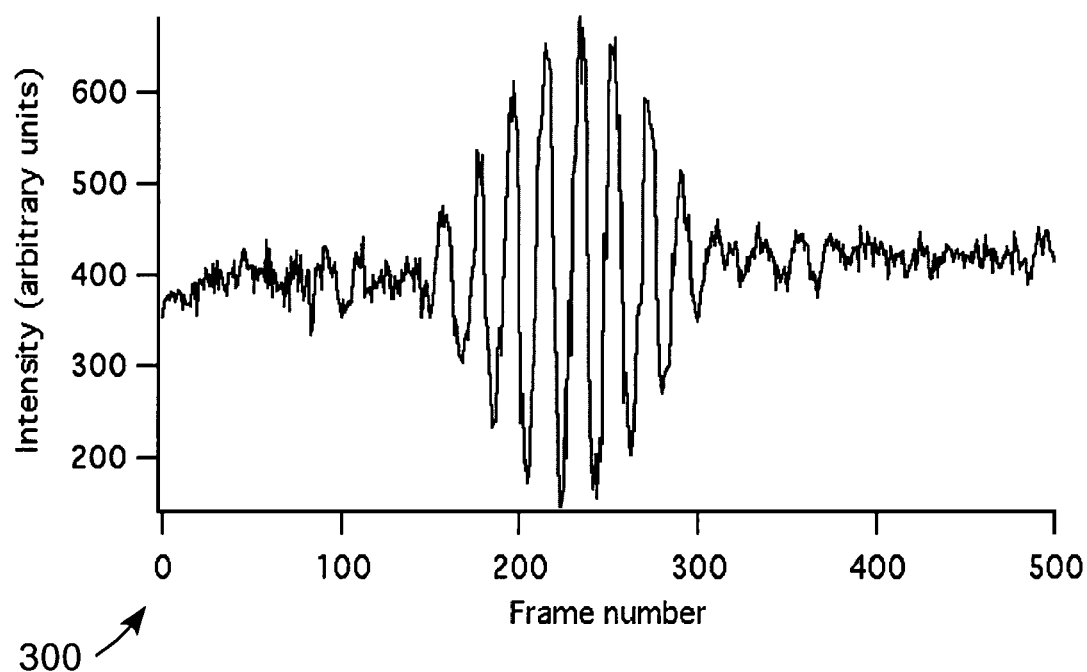
FIG. 3 shows an example of an intensity profile (sometimes referred to as an interferogram or a fringe packet) that may be collected by a single pixel as an adjustable-optical path is varied.

As the adjustable-optical path is varied, pixels in image-capture array 145 may capture the varying intensities of the fringes as the fringes sweep past the pixels. FIG. 3 shows an example of intensity profile 300 (sometimes referred to as an interferogram or a fringe packet) that may collected by a single pixel as the adjustable-optical path is varied. The vertical axis of the intensity profile represents arbitrary intensity units and the horizontal axis represents frame numbers corresponding to images of the interference patterns captured by a pixel. The intensity profile shown in FIG. 3 may be generated, for example, by varying the adjustable-optical path through a span of about 15 micrometers in about 30 nanometer steps.

Figure 4:
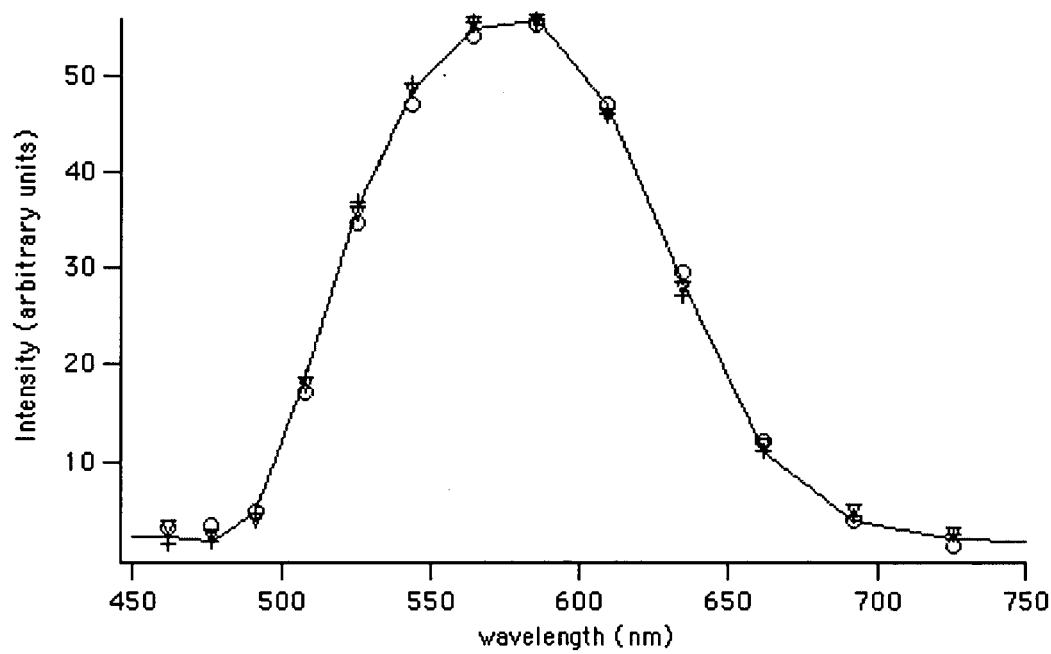
FIG. 4 shows a spectrogram according to an embodiment of the present invention.

As mentioned briefly above, computation module 150 is configured to Fourier transform an intensity profile, such as the intensity profile shown in FIG. 3 and thereby derive spectral information for a wavefront from which the intensity profile is derived. Computation module 150 may be configured to transform the intensity profiles generated by each pixel in image-capture array 145 or a subset thereof. Fourier transformation of the intensity profile shown in FIG. 3 may provide, for example, the spectral information shown in spectrogram 400 of FIG. 4. Spectrogram 400 shows spectral information for an approximately white light source. Computation module 150 may be implemented in a software, hardware, firmware or a combination of the foregoing. For example, the computation module may be implemented in software code configured to run on a personal computer, dedicated electronic devices or the like. Alternatively, the computation module may be implemented in a computer chip, such as an application specific (ASIC) device, configured to operate as a stand-alone electronics device or configured to be used in a personal computer configured to control the computer chip. These example implementations of Fourier transformation module 110 and computation module 150 are not exhaustive; those of skill in the art will know of a number of ways to implement a these modules, which are configured to Fourier transform interference patterns and more specifically transform intensity profiles.

Figure 5:
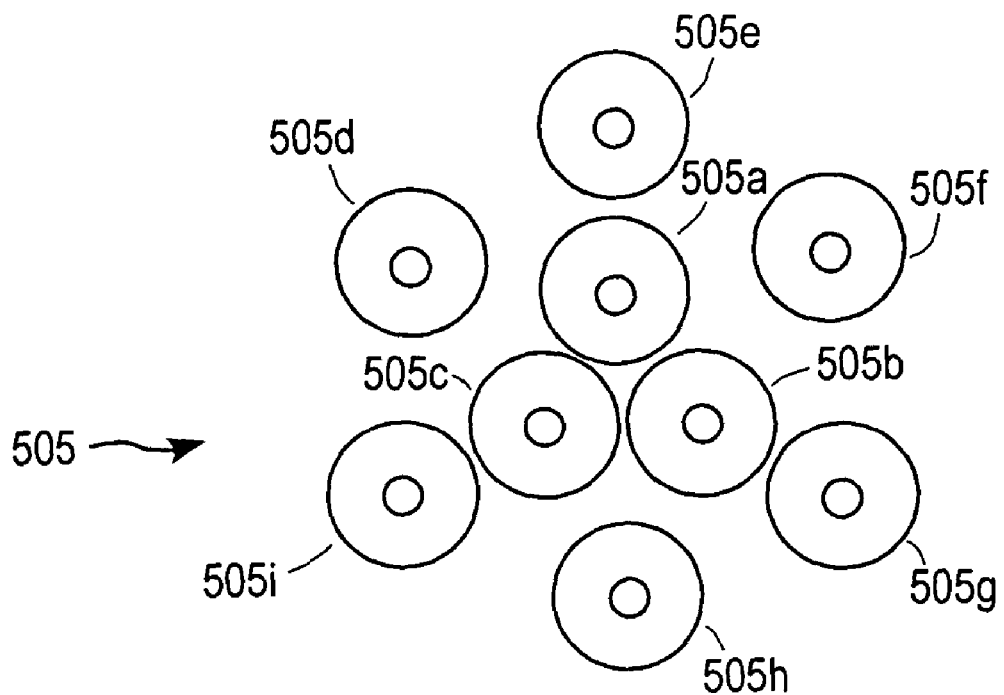
FIG. 5 shows a top view of Fizeau interferometer that includes nine collection devices according to an embodiment of the present invention.
Figure 6:
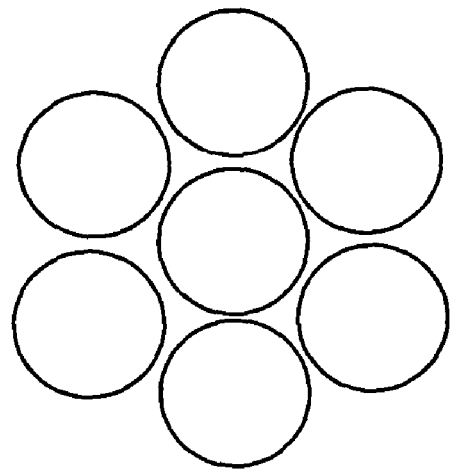
FIG. 6 shows an example of an interference pattern that may be generated by three collection devices.

While Fizeau interferometer 105 has been characterized above as including two collection devices, embodiments of the present invention may include Fizeau interferometers that include more than two collection devices. For example, U.S. Pat. No. 5,905,591 of Duncan et al., filed Feb. 18, 1997, titled Multi-Aperture Imaging System, which is incorporated herein by reference for all purposes and is owned by Lockheed Martin Corporation, owner of the present invention, describes a multi-aperture telescope forming a Fizeau interferometer that includes a number of sub-aperture telescopes and may be included in a Fourier transform spectrometer according to an embodiment of the present invention. FIG. 5 shows a top view of another Fizeau interferometer 500 that includes nine collection devices labeled 505a–505i that may be includes in another embodiment of the present invention. Each of collection devices 505a–505i may be configured similarly to the collection devices described above. For example, each of the collection devices may include an optical-path-delay mechanism, such as that shown in FIG. 1 and described above. One or more of the optical-path-delay mechanisms of collection devices 505a–505i may be adjusted to vary their corresponding adjustable-optical paths to generate interference patterns that are Fourier transformed. It should be understood that while the foregoing described exemplary embodiments include two, nine and twelve collection devices, embodiments of the present invention are not limited to these numbers of collection devices. Nearly any number of collection devices may be included in Fizeau interferometers that may be included in Fourier transform spectrometers according to embodiments of the present invention. Therefore, the foregoing examples are not limiting on the invention as claimed, but should be understood to be exemplary embodiments. While the above-described embodiments of Fourier transform spectrometers include Fizeau interferometers that include a number of collection devices, not all collection devices need be used in combination to form interference patterns. Fewer than the total number of collection devices included in a Fizeau interferometer may be used to generate interference patterns. For example, collection devices 505a–505c may be used to generate the interference pattern shown in FIG. 6.

Figure 7:
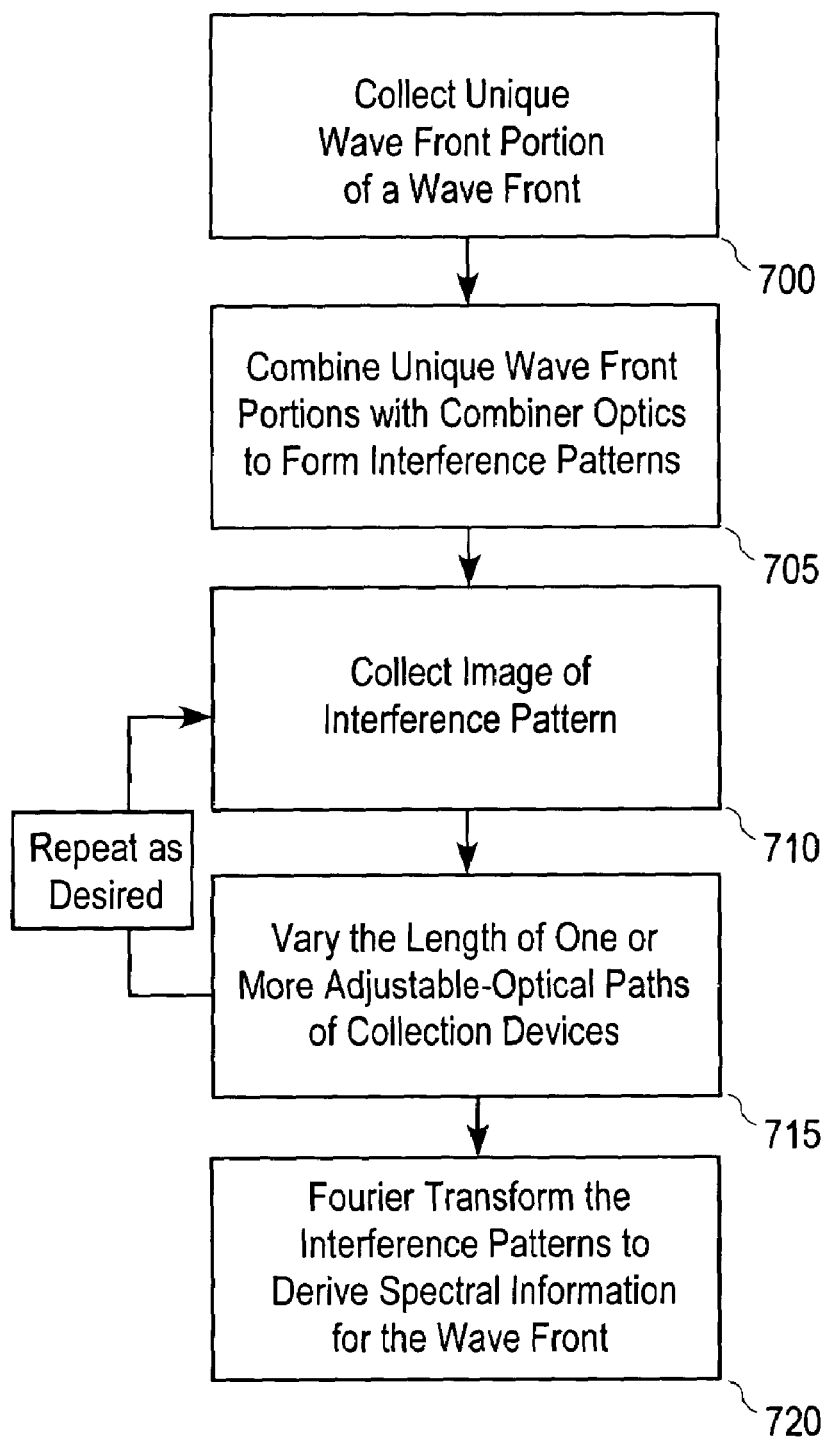
FIG. 7 is a high-level flow chart showing steps for deriving spectral information from a wavefront according to an embodiment of the present invention.

FIG. 7 is a high-level flow chart showing steps for deriving spectral information from a wavefront according to an embodiment of the present invention. It should be realized that the steps shown in FIG. 7 are not limiting on the invention as recited in the claims. Other techniques having fewer, substitute, and/or additional steps are within the purview of the invention and will be readily apparent to those of skill in the art. At 700, a plurality of select wavefront portions of a wavefront is collected by a corresponding plurality of collection devices. At 705, the wavefront portions are combined by a set of combiner optics and projected onto an image plane (e.g., a real image plane). According to one embodiment, the wavefront portions are steered into the combiner optics by sets of steering mechanisms. At 710, an interference pattern formed at the image plane is captured by an image-capture array. At 715, one or more adjustable-optical paths of the collection devices are varied and step 710 is repeated for each adjustment of the one or more adjustable-optical paths. Varying one or more adjustable-optical paths and capturing images of the interference patterns for the various path lengths may be repeated as desired. For example, the adjustable-optical paths may be varied by relatively large distances if relatively high-resolution spectral information is desired. At 720, image information for the interference patterns is Fourier transformed to derive the spectral information for the wavefront. Image information collected by one or more pixels in an image-capture array may be Fourier transformed to extract spectral information.

The following discussion provides a brief overview of the theory of Fourier transform spectroscopy. In the case that a wavefront includes a single wave number, $k=2\pi/\lambda$, the total intensity of light at a point on an image plane may be $$I(\Delta)=2I_o(1+\cos(k\Delta)),$$

wherein $\Delta$ is a piston offset (i.e., optical path length difference) between two collection devices, which illuminate a point at which $I(\Delta)$ is measured with $I_o$. In the case that a wavefront includes a spectrum of light, the intensity of illumination at the point may be described with the integral expression:

$$I(\Delta) = 2\int I_o(k)(1 + \cos(k\Delta))dk$$
$$= \int E(k)dk + \int E(k)\cos(k\Delta))dk.$$

In the above expression, the first integral, $\int E(k)dk$, is the total energy on the focal plane at the point of interest, and the second integral, $\int E(k)\cos(k\Delta))dk$, is the Fourier transform of $I(\Delta)$. Fourier transformation theory provides that the integrals may be rewritten as $$E(k)=\int I(\Delta)\cos(-k\Delta))d\Delta$$

in the limit where $d\Delta$ is continuous and extends to infinity. $E(k)$ represents the spectral information included in a wavefront and may be calculated by Fourier transforming the intensity distribution $I(\Delta)$ (e.g., interferogram, such as the intensity distribution shown in FIG. 4). A finite range of $d\Delta$ has two effects on an estimate of $E(k)$. A first effect is that the resolution is proportional to $1/L$, wherein L is a total path difference between two collection devices. That is, relatively high spectral resolution may be achieved by pistoning the collection devices by relatively large amounts and relatively low spectral resolution may be achieved by pistoning the collection devices by relatively small amounts. A second effect is that the finite data sample convolves $E(k)$ with the transfer of a windowing function. To minimize ringing due to the Gibbs phenomena, a Hanning window is used. A further understanding of Fourier transformation spectroscopy theory may be found in *Transformations in Optics*, of L. Mertz, Wiley, New York, 1965, which is incorporated by reference herein.

It is to be understood that the examples and embodiments described above are for illustrative purposes only and that various modifications or changes in light thereof will be suggested to persons skilled in the art and are to be included within the spirit and purview of this application and scope of the appended claims. Therefore, the above description should not be taken as limiting the scope of the invention as defined by the claims.

What is claimed is:

1. A spectrometer comprising:
    a plurality of sub-aperture telescopes forming an extended aperture telescope, wherein each sub-aperture telescope includes an adjustable-optical path and is configured to collect a select portion of a wavefront, and wherein a center-to-center spacing between adjacent sub-aperture telescopes of the plurality of sub-aperture telescopes is not greater than 2d, where d is a diameter of one of the adjacent sub-aperture telescopes;
    combiner optics configured to interfere the select portions of the wavefront at an image plane of the plurality of sub-aperture telescopes to form interference patterns at the image plane; and
    a Fourier transformation module configured to derive spectral information from the interference patterns.

2. The spectrometer of claim 1, wherein, to derive the spectral information, the Fourier transformation module is configured to Fourier transform the interference patterns with one or more of the adjustable-optical paths set at a variety of path lengths.

3. The spectrometer of claim 2, wherein the variety of path lengths represents a relative path-length difference between one or more of the adjustable-optical paths.

4. The spectrometer of claim 1, wherein the Fourier transformation module includes an image-capture array disposed at the image plane and configured to capture images of the interference patterns.

5. The spectrometer of claim 4, wherein the Fourier transformation module is configured to Fourier transform intensity profiles generated by one or more pixels included in the image-capture array.

6. The spectrometer of claim 4, wherein the image-capture array includes a charge-coupled device (CCD) array or a complimentary metal oxide (CMOS) array.

7. A spectrometer comprising:
    a Fizeau interferometer having a plurality of optical collectors, wherein one or more of the optical collectors includes an adjustable-optical path, and wherein each optical collector is configured to collect a select portion of a wavefront, and wherein a center-to-center spacing between adjacent optical collectors of the plurality of optical collectors is not greater than 2d, where d is a diameter of one of the adjacent optical collectors; and
    a Fourier transformation module configured to derive spectral information of the wavefront from interference patterns of the select portions of the wavefront.

8. The spectrometer of claim 7, wherein the Fizeau interferometer forms an extended aperture telescope.

9. The spectrometer of claim 7, wherein the spectrometer is configured to be deployed in space.

10. The spectrometer of claim 7, wherein, to derive the spectral information, the Fourier transformation module is configured to Fourier transform the interference patterns of the wavefront with one or more of the adjustable-optical paths set at a variety of path lengths.

11. A method for deriving spectral information from a wavefront, the method comprising:
    collecting a plurality of select portions of a wavefront with a corresponding plurality of sub-aperture telescopes which form a multi-aperture telescope, wherein a center-to-center spacing between adjacent sub-aperture telescopes of the plurality of sub-aperture telescopes is not greater than 2d, where d is a diameter of one of the adjacent sub-aperture telescopes;

interfering the select portions of the wavefront at an image plane of the multi-aperture telescope to form interference patterns at the image plane; and Fourier transforming the interference patterns to derive spectral information for the wavefront.

12. The method of claim 11 further comprising generating a spectrogram from the spectral information.

13. The method of claim 11, wherein interfering the select portions of the wavefront includes interfering the select portions of the wavefront with a combiner telescope.

14. The method of claim 11 further comprising collecting images of the interference patterns with an imaging array.

15. The method of claim 14, wherein Fourier transforming the interference patterns includes Fourier transforming images of the interference patterns collected by the imaging array.

16. The method of claim 14 further comprising locating the imaging array at an image plane of the multi-aperture telescope.

17. The method of claim 11 further comprising:
pistoning adjustable-optical paths of the sub-aperture telescopes at a plurality of positions; wherein each of the interference patterns corresponds to a select piston position of the adjustable-optical paths.

18. The method of claim 17 further comprising:
Fourier transforming one or more intensity profiles generated by one or more pixels, respectively, of an image-capture array.

19. A spectrometer comprising:
a plurality of sub-aperture telescopes, each sub-aperture telescope being configured to collect a select portion of a wavefront, a center-to-center spacing between adjacent sub-aperture telescopes of the plurality of sub-aperture telescopes not being greater than 2d, where d is a diameter of one of the adjacent sub-aperture telescopes, at least one of the plurality of sub-aperture telescopes including an adjustable-optical path;

combiner optics configured to interfere the select portions of the wavefront at an image plane of the plurality of sub-aperture telescopes to form interference patterns at the image plane; and a Fourier transformation module configured to derive spectral information from the interference patterns.

20. The spectrometer of claim 19, wherein the Fourier transformation module is configured to Fourier transform the interference patterns to derive the spectral information.

21. The spectrometer of claim 19, wherein, to derive the spectral information, the Fourier transformation module is configured to Fourier transform the interference patterns of the wavefront with the adjustable-optical path set at a variety of path lengths.

22. The spectrometer of claim 19, wherein the Fourier transformation module is configured to generate a spectrogram of the wavefront.

23. The spectrometer of claim 19, wherein the Fourier transformation module includes an image-capture array disposed at the image plane configured to capture images of the interference pattern.

24. The spectrometer of claim 23, wherein the image-capture array includes a charge-coupled device (CCD) array or a complimentary metal oxide (CMOS) array.

25. The spectrometer of claim 19, wherein the Fourier transformation module includes software code configured to perform the Fourier transformation.

26. The spectrometer of claim 19, wherein the Fourier transformation module includes electronic hardware configured to perform the Fourier transformation.

27. The spectrometer of claim 19, wherein the spectrometer is configured to be deployed in space.

* * * * *